United States Patent [19]

Tomatsu et al.

[11] Patent Number: 4,667,492

[45] Date of Patent: May 26, 1987

[54] LOCKING DEVICE FOR A SEAT BACK OF A TRUNK THROUGH-SEAT(SIC)

[75] Inventors: Toshiaki Tomatsu; Toshiaki Shindou, both of Takabayashi, Japan

[73] Assignee: NHK Spring Co., Ltd., Yokohama, Japan

[21] Appl. No.: 769,898

[22] Filed: Aug. 27, 1985

[30] Foreign Application Priority Data

Sep. 3, 1984 [JP] Japan ............................ 59-133673[U]

[51] Int. Cl.⁴ .............................................. E05B 65/44
[52] U.S. Cl. ........................................ 70/261; 70/118; 292/254; 297/379
[58] Field of Search ................ 70/237, 261, 118, 120, 70/150; 297/379; 312/219, 217, 218; 292/254, 168, 171, 36, 40, 150

[56] References Cited

U.S. PATENT DOCUMENTS

| 427,082 | 5/1890 | Hotaling | 292/254 |
|---|---|---|---|
| 448,986 | 3/1891 | McCann | 292/150 |
| 471,118 | 3/1892 | Higgins | 292/150 |
| 528,108 | 10/1894 | Paul et al. | 292/254 |
| 1,126,728 | 2/1915 | Dillabough | 292/254 |
| 1,200,882 | 10/1916 | Schaefer | 312/218 |
| 1,277,412 | 9/1918 | Hardart | 312/218 |
| 1,350,989 | 8/1920 | Cox | 70/237 |
| 1,468,245 | 9/1923 | McDermott | 70/118 |
| 2,486,460 | 11/1949 | Bonenberger | 312/217 |
| 2,687,320 | 8/1954 | Moler | 292/171 |
| 3,294,443 | 12/1966 | Beckman et al. | 297/379 |
| 3,387,885 | 6/1968 | Boschen et al. | 297/379 |
| 3,550,949 | 12/1970 | Bonnaud | 297/379 |
| 3,666,319 | 5/1972 | Moloney, Jr. | 297/113 |
| 3,794,380 | 2/1974 | Mertz | 297/379 |
| 3,807,790 | 4/1974 | Erard | 297/379 |
| 3,828,475 | 8/1974 | Eblen | 292/254 |
| 3,975,934 | 8/1976 | Babai et al. | 70/120 |
| 3,990,278 | 11/1976 | Perelson | 70/120 |
| 4,080,757 | 3/1978 | Westerman | 292/171 |
| 4,105,245 | 8/1978 | Simons et al. | 297/379 |

FOREIGN PATENT DOCUMENTS

| 0116001 | 8/1984 | European Pat. Off. | 70/278 |
|---|---|---|---|
| 439101 | 1/1927 | Fed. Rep. of Germany | 292/254 |
| 1130729 | 5/1962 | Fed. Rep. of Germany | 312/219 |
| 2539603 | 7/1984 | France | 70/261 |
| 211925 | 12/1983 | Japan | 70/261 |
| 204597 | 5/1966 | Sweden | 70/237 |
| 56532 | 5/1912 | Switzerland | 292/254 |

Primary Examiner—Thomas J. Hocko
Assistant Examiner—Suzanne L. Dino
Attorney, Agent, or Firm—Fleit, Jacobson, Cohn & Price

[57] ABSTRACT

A locking device of a seat back of a trunk through-seat in order to prevent theft from a trunk compartment by maintaining the locking state of the seat back with the aid of key operation. The locking device includes lock pins which close or open the seat back stoppers which limit the movement of the lock pins in an upward direction, levers which move the lock pins in an upward direction by rotating the lock pins with the aid of the operative members, and keys which execute the slide of the stoppers. The stopper is moved laterally from a position above the lock pin and then the lock pin is moved in the upward direction by rotating the lever. Thus the lock of the seat back is released.

2 Claims, 4 Drawing Figures ically attached with a hinge pin 7 at the center as shown in FIG. 2. One end of the lever 6 is connected to an operating member 9 at the outside through a strap plate 8. The operating member 9 which, for instance, comprises a strap, is adapted to extend to the outside of the seat back 3 as shown in FIG. 1 and FIG. 4. The locking device includes said lever, a lock pin 10 inserted into said locking hole 5, and a stopper 14 which regulates the movement of the lock pin 10 toward the upper direction. Each of

LOCKING DEVICE FOR A SEAT BACK OF A TRUNK THROUGH-SEAT(SIC)

BACKGROUND OF THE INVENTION

This invention relates to a locking device which locks a seat back in a trunk through-seat that makes it possible to take out baggages in a trunk compartment of a car.

Heretofore, the seat back of the trunk through-seat includes the use as a seat back, said trunk through-seat being provided with an operation member such as a strap, a knob or the like, which opens the seat back at the outer side of the seat back, whereby the seat back is adapted to be opened with ease from inside the car by operating said operation member.

Accordingly, since the seat back of the conventional trunk through-seat is easily opened or closed from inside the car and valuables, baggages and the like in the trunk compartment are also taken out with ease, it is very unsafe from the point of the prevention of theft.

SUMMARY OF THE INVENTION

An object of this invention is to provide a locking device of a seat back of a trunk through-seat which enables the prevention of theft from a trunk compartment by performing the locking or unlocking of the seat back with a key and maintaining a locking state of the seat back by keeping the key plate.

BRIEF DESCRIPTION OF DRAWINGS

Drawings represent embodiments to attain this invention.

DETAILED DESCRIPTION OF THE INVENTION

Figure 4:
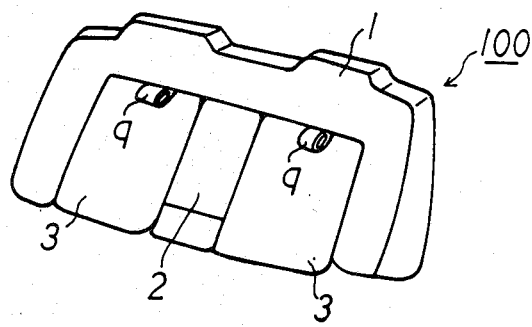
FIG. 4 is a perspective view when this device is incorporated in a seat back.

FIG. 4 is an embodiment wherein a trunk through seat 100 is constructed by dividing a seat back into three parts. The invention will be described in details based upon a 3 division type as follows.

The trunk through-seat 100 is provided with an outer circumferential edge formed by the outer edge of seat 1 and seat back 3 and 3, which includes the use as seat back seats interposing an armrest 2 between said both seat backs.

Figure 1:
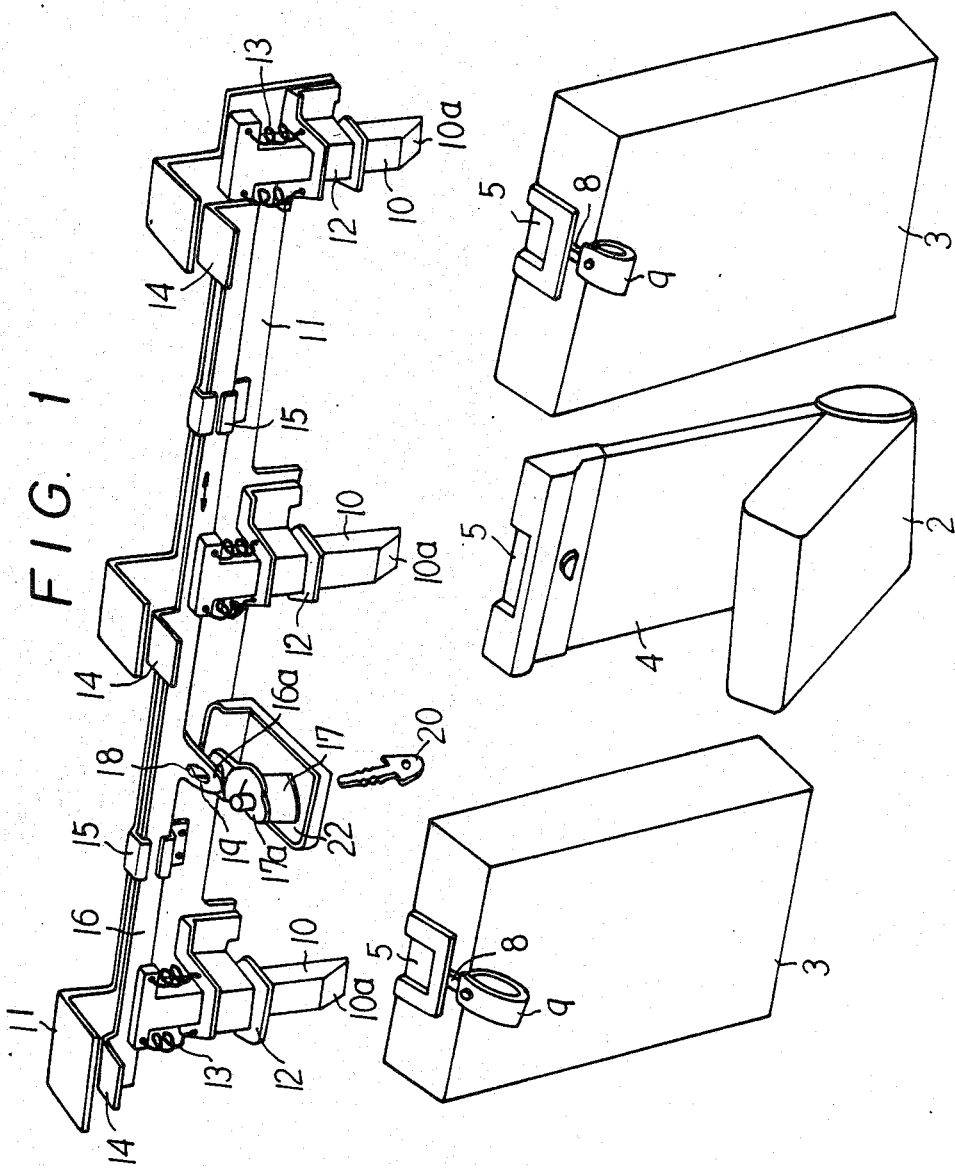
FIG. 1 is a perspective view which shows a whole embodiment of this invention.
Figure 3:
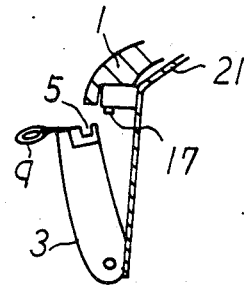
FIG. 3 is a sectional view which shows partially the operation of opening and closing of the seat back.

The locking devices of the seat backs 3 and 3, and a seat back 4 positioned at the inner portion of the armrest 2 will be described referring to FIG. 1 and to FIG. 3 as follows.

Figure 2:
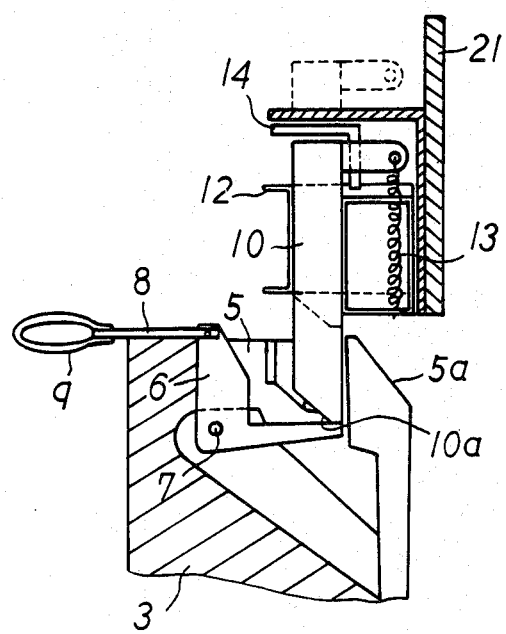
FIG. 2 is a sectional view which shows partially a locking state of the seat back.

A locking hole 5 is provided at the upper portion of each seat back. At the inner part of said locking hole is a lever 6 having an L-shape and is rotatively attached with a hinge pin 7 at the center as shown in FIG. 2. One end of the lever 6 is connected to an operating member 9 at the outside through a strap plate 8. The operating member 9 which, for instance, comprises a strap, is adapted to extend to the outside of the seat back 3 as shown in FIG. 1 and FIG. 4. The locking device includes said lever, a lock pin 10 inserted into said locking hole 5, and a stopper 14 which regulates the movement of the lock pin 10 toward the upper direction. Each of lock pins 10, 10 and 10 is respectively installed into one of housings 12, 12 and 12 and is movable in the vertical direction, said each housing being attached to a base plate 11 fixed to a car body 21. The housings 12, 12 and 12 are arranged so as to satisfy intervals of said locking holes 5, 5 and 5, respectively, and each of lock pins 10, 10 and 10 is energized by a spring 13 so that it may slide downwardly in a lower direction. Accordingly, the lower end of each of the lock pins 10, 10 and 10 is adapted to be inserted always into the locking hole 5 correspondent thereto.

The stoppers 14 are formed to protrude from a long slider 16 supported slidably in a transverse direction by holders 15 and 15 fixed to said base plate 11 so that each interval between stoppers 14 may equal that of the lock pins 10. The stopper 14 shown in the embodiment is formed to be a tongue piece having an L-shape. The numeral 17 is a key fixed to a bracket 22 attached to the base plate 11. For instance, it is attached so as to be positioned at the back of the armrest 2. In the key 17, a pin 18 is secured to a key arm 17a and is loosely inserted into an elongated hole 19 provided in a protruding piece 16a extending from the slider 16, whereby said key 17 is connected with the slider 16. Accordingly, it is possible to slide the slider 16 in the transverse direction by turning the pin 18 by operating the key 17 with a key plate 20. The sliding of the slider 16 in the transverse direction enables the positioning of the stoppers 14, 14 and 14 to be above the upper portions of lock pins 10, 10 and 10 respectively corresponding thereto or to transfer those stoppers so as to be spaced laterally from these positions. Further, inclined surfaces 10a, 10a and 10a are formed at the lower portions of said lock pins 10, 10 and 10 respectively. The inclined surface 10a abuts an inclined wall surface 5a of the locking hole at the time of closing the seat back 3, thereby causing the inclined surface 10a to slide along said inclined wall surface 5a to move the lock pin 10 in the upward direction.

The operation of the locking device thus constructed will be described as follows.

First, in the closing operation of the trunk 3 (or 4), the inclined wall surface 5a of the locking hole abuts the inclined surface 10a of the lower end of the lock pin nearby the closing terminal of the seat back. When the seat back is pushed down toward the trunk, the sliding which occurs between said inclined surfaces 5a and 10a pushes up the lock pin 10 against the spring force of spring 13, whereby the lower end portion of the lock pin 10 is inserted into the locking hole 5 after getting over the wall of the locking hole as shown in FIG. 2. Thus the closing operation of the seat back is ended. When the lock pin 10 is inserted into the locking hole 5, the lower end portion of the lock pin 10 is adapted to abut to another end of the lever 6 that is rotatively supported in the locking hole 5.

Then, the slider 16 is caused to slide laterally along base plate 11 by the operation of key 17 with key plate 20 to position the stopper 14 at the upper portion of the lock pin 10. In this condition, even if the lock pin 10 is forced to move toward the upper direction with the aid of another end portion of the lever 6 by rotating the lever 6 pulling the strap 9, the seat back 3 (or 4) sustains the locking state because said movement toward the upper direction is regulated by the stopper 14.

On the other hand, the opening operation of the seat back 3 (or 4) is conducted as follows.

First, the slider 16 is caused to slide laterally by the operation of key 17 with the aid of key plate 20 to move the stopper 14 from above the lock pin 10. Since there exists no material by which the movement of lock pin 10 toward the upper direction is regulated in this transferred state of the stopper 14, the movement of the lock pin 10 can be performed with the aid of another end portion of the lever 6 by rotating the lever 6 by pulling the strap 9. If the lower end portion of the lock pin 10 gets over the top end portion of the hole wall of the locking hole 5, the seat back 3 including the use as the seat back pulled by the strap 9 is released from locking as shown in FIG. 3 and at the same time the seat back 3 falls down forward. Thus the opening operation is performed.

Further, although the above embodiment is applied to the trunk through-seat having a 3 division type structure, those having 2 division types are also similary applicable.

Therefore, the operation of closing and opening of the seat back including the use as seat back according to this invention can be performed easily with simple operations, such as operating the operation member at the outside of the seat or pushing in as same as in the conventional trunk through-seat, thereby being able to lock or release it with the key plate 20. Therefore, it is possible to sustain the locking state of the seat back by the safe-keeping of the key plate and thereby, prevent theft from the trunk, compartment effectively.

What we claim is:

1. A locking device for a seat back of a vehicle trunk through-seat comprising: a seat back of a vehicle rear seat including a seat cushion, said seat back divided into a plurality of seat back portions, the divided portions being individually supported pivotably and individually tiltable forwards and backwards with respect to a seat cushion so that the portions may be used as individual seat backs;

locking holes provided in the pivotable seat back portions, each of the holes defined by an opening at an upper part of the seat back portions;

a plurality of independently operable lock pins which are slidably supported in a seat back in a plurality of respective housings for movement in a substantially vertical direction toward and away from a respective seat back portion;

a base plate mounted in the seat back to support said lock pin housings and positioned to support said lock pins opposite to respective locking holes, said lock pins each individually biased in a downward direction so that a lower end portion of each of said lock pins can be inserted into respective ones of said locking holes;

an elongated slider slidably carried in said base plate for movement in a transverse direction relative to the direction of movement of said lock pins;

a plurality of stoppers carried by said slider and extending outwardly from said slider to overlie respective ones of said lock pins to limit upward movement of the lock pins;

a lever pivotably carried in each of said locking holes of said pivotable seat back portions to move a respective lock pin upward from and outward of its associated locking hole upon rotation of said lever by an operating member that extends outwardly of the seat back; and a key carried by said base plate, said key including a projection engageable with said slider, said projection extending from a pivotable key arm carried by said key;

said slider being movable to carry said stoppers from a position overlying said lock pins by the operation of the key to permit the lock pins to move vertically by the pivoting of said levers by operation of each operating member to individually release each pivotable seat back portion to permit access to a vehicle trunk.

2. A locking device according to claim 1, wherein said lock pins include an inclined surface formed at a lower end portion of the pin and said locking holes include inclined surfaces for engagement with said inclined surfaces of said lock pins wherein sliding of the inclined surface of the lock pin against the inclined surface of the locking hole causes upward movement of the lock pin relative to the locking hole during a seat back closing operation.

* * * * *